Aug. 4, 1953 R. F. NORRIS ET AL 2,647,717
SHOCK MOUNTING
Filed Oct. 26, 1944
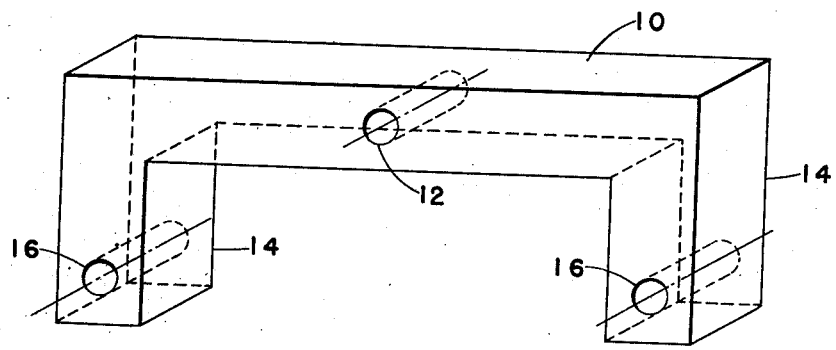
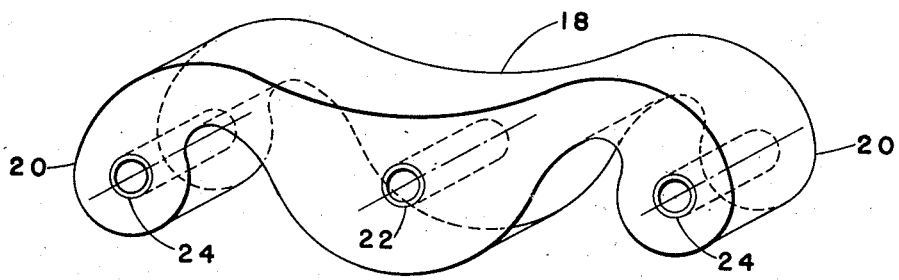
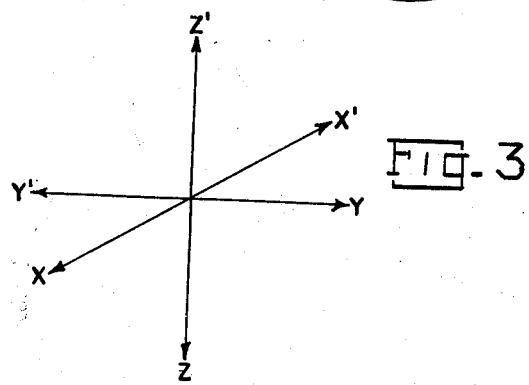
Inventors
RALPH F. NORRIS
ROBERT D. AVERY Patented Aug. 4, 1953

2,647,717

UNITED STATES PATENT OFFICE 2,647,717

SHOCK MOUNTING

Ralph F. Norris, Madison, Wis., and Robert D. Avery, Mineola, N. Y., assignors to the United States of America as represented by the Secretary of the Navy Application October 26, 1944, Serial No. 560,450

5 Claims. (Cl. 248—358)

This invention relates to shock mountings, and more particularly to a shock mounting having satisfactory vibration isolation characteristics in a plurality of directions.

When relatively delicate measuring instruments are mounted in carriers such as aircraft, means must be provided for eliminating the destructive effects of vibration produced in the operation of the carrier. Vibration control or isolation in this and in other applications requires the use of a shock mounting which is soft in the direction of the disturbing forces producing vibration and which is capable of supporting the instrument to be isolated.

It is well known that the best protection against vibration is afforded by rubber shock mountings so arranged that the rubber is loaded in shear, rubber so loaded providing both softness and low damping in the direction of loading. In directions other than the direction in which the mount is loaded in shear, vibration isolation is in general unsatisfactory due to the fact that in such directions the rubber is loaded either in compression or in tension. Such shock mountings, therefore, provide for isolation of disturbing forces in a single direction. In many cases, however, disturbing forces may occur in a plurality of directions and their directional distribution may be almost random. Consequently, adequate vibration isolation using previous shock mountings is often difficult.

It is an object of the present invention, therefore, to provide a shock mounting in which the advantages of shear-loaded rubber are realized for isolation of vibrations due to simultaneous disturbing forces in a plurality of directions.

Accordingly, the invention provides, in one aspect, a rubber shock mounting comprising a beam having a mounting point substantially at the center thereof, and a pair of members extending outwardly from the beam and spaced on opposite sides of the center thereof, each of these members having a mounting point positioned adjacent its outer end.

The above and other features of the invention will be described in the following detailed specification and pointed out in the appended claims, in which:

Fig. 1 is a schematic view illustrating the principle of operation of the shock mounting of the invention;

Fig. 2 is a perspective view of a shock mounting according to the invention; and Fig. 3 is a representation of a set of orthogonal reference axes in respect to which the action of the shock mountings of Figs. 1 and 2 may be described.

Referring to Fig. 1, the shock mounting is shown as comprising a beam 10 having substantially at its center a mounting point 12, this mounting point being shown as a hole extending through the beam and adapted to receive through bolts or mounting pins. Paired members 14 extend outwardly from the ends of beam 10 on opposite sides of the center thereof, and are each provided with a mounting point 16 similar to mounting point 12. Members 14, together with beam 10 form a substantially U-shaped composite member, the members 14 being at right angles to beam 10. In the application of this mounting, mounting point 12 may be held fixed and the device to be protected suspended from mounting points 16, or the converse arrangement in which mounting points 16 are fixed and the device is suspended from mounting point 12 may be used. The operation of the mounting is the same for either of the arrangements just mentioned.

For an understanding of the operation of the mounting, it is convenient to assign a set of orthogonal reference axes (Fig. 3) X—X', Y—Y', and Z—Z', in respect to which disturbing forces and translations of the protected device may be considered. For convenience, the X—X' axis (Fig. 3) will be referred to as the longitudinal axis, the Y—Y' axis as the transverse axis, and the Z—Z' axis as the vertical axis. For the present, it will be assumed that the shock mounting is used with mounting point 12 fixed and that the protected device is suspended from mounting points 16.

Disturbing forces in the longitudinal direction X—X' tend to cause translations of mounting points 16 in respect to mounting point 12, stressing rubber members 14 in shear. In addition, such forces tend also to stress the portions of beam 10 lying between mounting point 12 and members 14 in shear. The advantages of shear-stressed rubber are, therefore, realized in protecting against vibration due to forces in the longitudinal direction.

Forces in the transverse direction Y—Y' tend to cause translation of mounting points 16 in respect to beam 10. As a result each of members 14 is stressed in shear, providing for transverse disturbing forces.

Disturbing forces in the vertical direction Z—Z' tend to translate the ends of beam 10 in respect to the center thereof, again loading the beam in shear. Since all disturbing forces may be resolved in the three orthogonal directions thus protected, it will appear that good vibration isolation is provided irrespective of the directional distribution of the disturbing forces.

The exact form of beam 10 and members 14, as well as their cross sections, may be varied considerably to impart varying degrees of softness to the mounting, it being desirable in some cases to provide for greater protection in one or more of the three chosen directions.

One embodiment of the invention providing for somewhat greater protection in the transverse and vertical directions than in the longitudinal direction is illustrated in Fig. 2. In this mounting a beam 18 and paired members 20 are molded as one piece, thus forming a generally U-shaped composite member, mounting points 22 and 24 being positioned substantially as in the mounting shown in Fig. 1. Beam 18 is reinforced at its center by an additional amount of rubber, while the section at the point at which members 20 join the beam is considerably reduced, the entire structure being of uniform thickness in the longitudinal direction. It will be recognized that this structure is softer—that is, requires less force to produce a unit deflection—in the transverse and vertical directions than in the longitudinal direction. Other variations in the shape of the beam and the outwardly extending members result in shock mountings having other characteristics, all of these mountings, however, providing for enhanced vibration isolation through the use of shear-loaded rubber in each of three chosen directions.

We claim:

1. A vibration dampening element for supporting an instrument on a panel comprising a U-shaped member consisting of a body portion and a pair of oppositely disposed legs attached thereto, said U-shaped member being composed of a non-metallic resilient material, the body portion of which is provided with a through hole substantially at the center thereof, and the legs of which are provided with through holes near their ends, said through holes being parallel to each other and running transversely of the member.

2. A vibration dampening element for supporting an instrument on a panel comprising a U-shaped member consisting of a body portion and a pair of oppositely disposed leg portions integral therewith and at right angles thereto, said body and legs being of substantially uniform cross-section and being composed of a non-metallic resilient unrestrained material, the body portion of which is provided with a through hole substantially at the center thereof and the legs of which are provided with through holes displaced laterally of said first named through hole near the ends of the legs, said through holes being parallel to each other and running transversely of the member.

3. A vibration dampening element for supporting an instrument on a panel comprising a substantially U-shaped member consisting of a body portion and a pair of leg portions at opposite ends of the body portions and substantially at right angles thereto, said member being of uniform cross-section and being composed of a non-metallic resilient homogeneous material, the body portion of which is provided with a through hole substantially at the center thereof, and the legs of which are provided with through holes adjacent their free ends, the center line of said through holes being parallel to each other and normal to the plane in which said body and legs lie.

4. A vibration dampening element for supporting an instrument on a panel comprising a substantially yoke shaped member consisting of a thickened body portion and a pair of head portions of substantially the same diameter as the thickest part of the body portion, said head portions being joined to the body portions by reduced neck portions, said member being of uniform thickness transversely thereof and being composed of a non-metallic resilient homogeneous material, the body portion of which is provided with a through hole substantially at the center thereof in the thickest part thereof, and the head portion being provided with through holes substantially centrally thereof, the center lines of said through holes being parallel to each other and extending transversely of the member.

5. A vibration dampening element for supporting an instrument on a panel comprising a member consisting of an elongated body and a pair of legs attached to opposite ends of the body, said member being composed of a non-metallic resilient material, the body of which is provided with a through hole substantially at the center thereof, and the legs of which are provided with through holes near their free ends, said through holes being parallel to each other and extending transversely of the member.

RALPH F. NORRIS.
ROBERT D. AVERY.

References Cited in the file of this patent

UNITED STATES PATENTS

| Number | Name | Date |
|---|---|---|
| 1,410,765 | Leas et al. | Mar. 28, 1922 |
| 1,420,082 | Dowd | June 20, 1922 |
| 2,037,032 | Lord | Apr. 14, 1936 |
| 2,269,245 | Blessing | Jan. 6, 1942 |
| 2,322,193 | Kaemmerling | June 15, 1943 |